(12) United States Patent
Mercnik et al.

(10) Patent No.: US 9,144,814 B2
(45) Date of Patent: Sep. 29, 2015

(54) SNOW-LUTIONS

(75) Inventors: Gery Hansy Mercnik, Niagara Falls (CA); Cyrille Desrosiers, Niagara-On-The-Lake (CA)

(73) Assignee: SNOW LUTIONS INC., Niagara Falls (CA)

(*) Notice: Subject to any disclaimer, the term of this patent is extended or adjusted under 35 U.S.C. 154(b) by 571 days.

(21) Appl. No.: 13/290,692

(22) Filed: Nov. 7, 2011

(65) Prior Publication Data

US 2013/0112765 A1 May 9, 2013

(51) Int. Cl.
*B05B 12/12* (2006.01)
*B05B 1/14* (2006.01)
*B05B 15/10* (2006.01)
*A01G 25/00* (2006.01)
*E01H 10/00* (2006.01)
*B05B 1/20* (2006.01)
*B05B 15/06* (2006.01)

(52) U.S. Cl.
CPC ............... *B05B 12/12* (2013.01); *A01G 25/00* (2013.01); *B05B 1/205* (2013.01); *E01H 10/005* (2013.01); *B05B 1/14* (2013.01); *B05B 15/066* (2013.01); *B05B 15/10* (2013.01)

(58) Field of Classification Search
CPC .......... B05B 1/14; B05B 12/12; B05B 12/14; B05B 15/10; E01H 10/005; A01G 25/00; A01G 25/16; A01G 25/165
USPC ............. 239/1, 11, 63–70, 75, 104, 106, 117, 239/200–204, 207, 289, 329, 548, 556, 560, 239/561, DIG. 1, DIG. 15; 404/71, 72, 75, 404/77, 79, 83, 84.05, 95
See application file for complete search history.

(56) References Cited

U.S. PATENT DOCUMENTS

| | | | | |
|---|---|---|---|---|
| 2,701,738 | A * | 2/1955 | Cerasi | 239/440 |
| 6,102,306 | A * | 8/2000 | Ask et al. | 239/201 |
| 6,450,731 | B1 * | 9/2002 | Bohnhoff | 405/37 |
| 6,994,271 | B2 * | 2/2006 | Tarara et al. | 239/67 |
| 2005/0156067 | A1 * | 7/2005 | Ivans | 239/723 |
| 2006/0204647 | A1 * | 9/2006 | Calabrese | 427/8 |
| 2007/0040044 | A1 * | 2/2007 | Lavacot | 239/207 |
| 2007/0205308 | A1 * | 9/2007 | Nishida | 239/547 |

* cited by examiner

*Primary Examiner* — Darren W Gorman
(74) *Attorney, Agent, or Firm* — Eugene Gierczak

(57) ABSTRACT

A method and system for distributing a fluid onto a selected surface having a sprinkler system with a sprinkler head; pumps and piping for distributing the fluid through the sprinkler system; where the sprinkler system has a first and second aperture and where the dispensing fluid for winter application includes calcium acetate or potassium acetate.

13 Claims, 8 Drawing Sheets

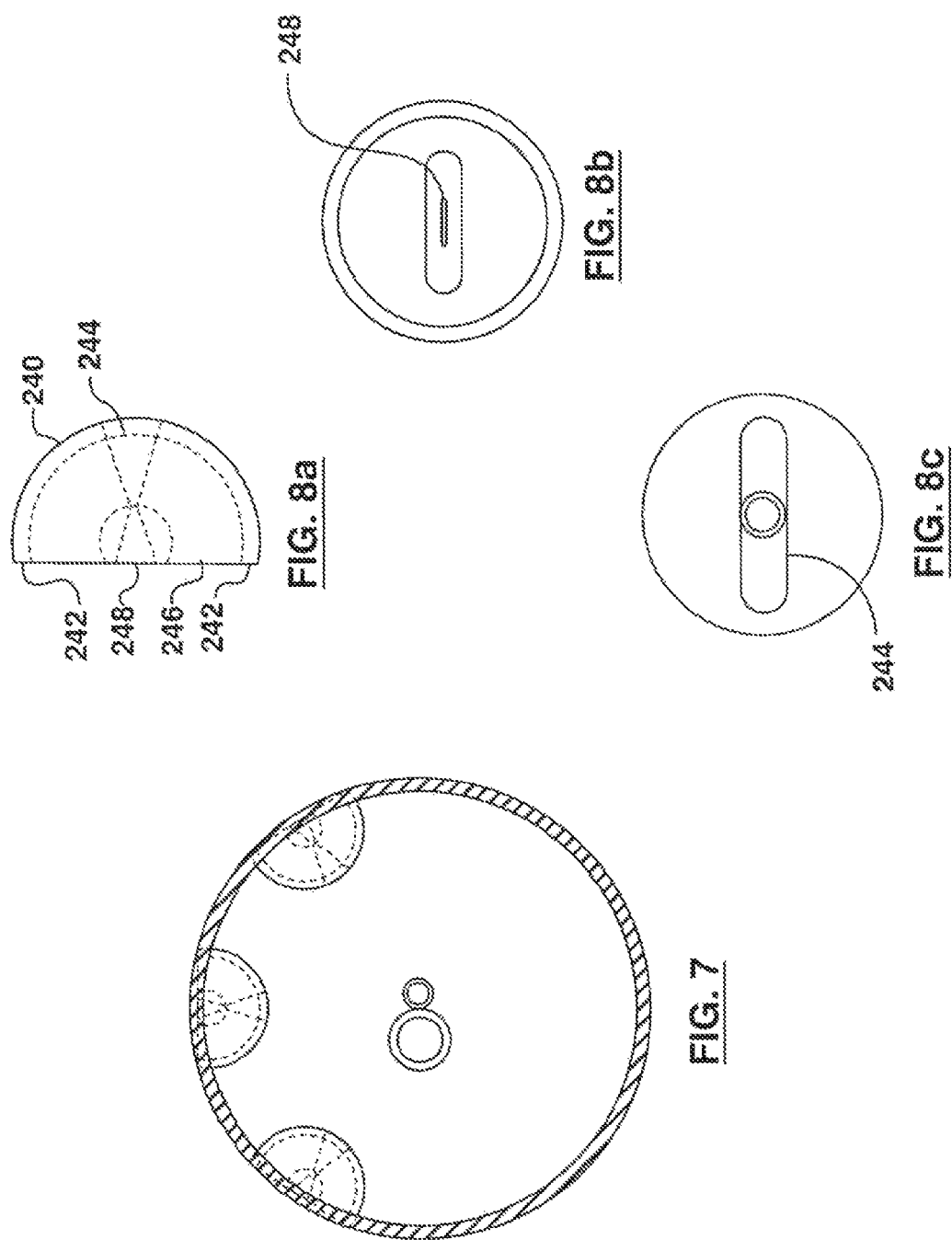

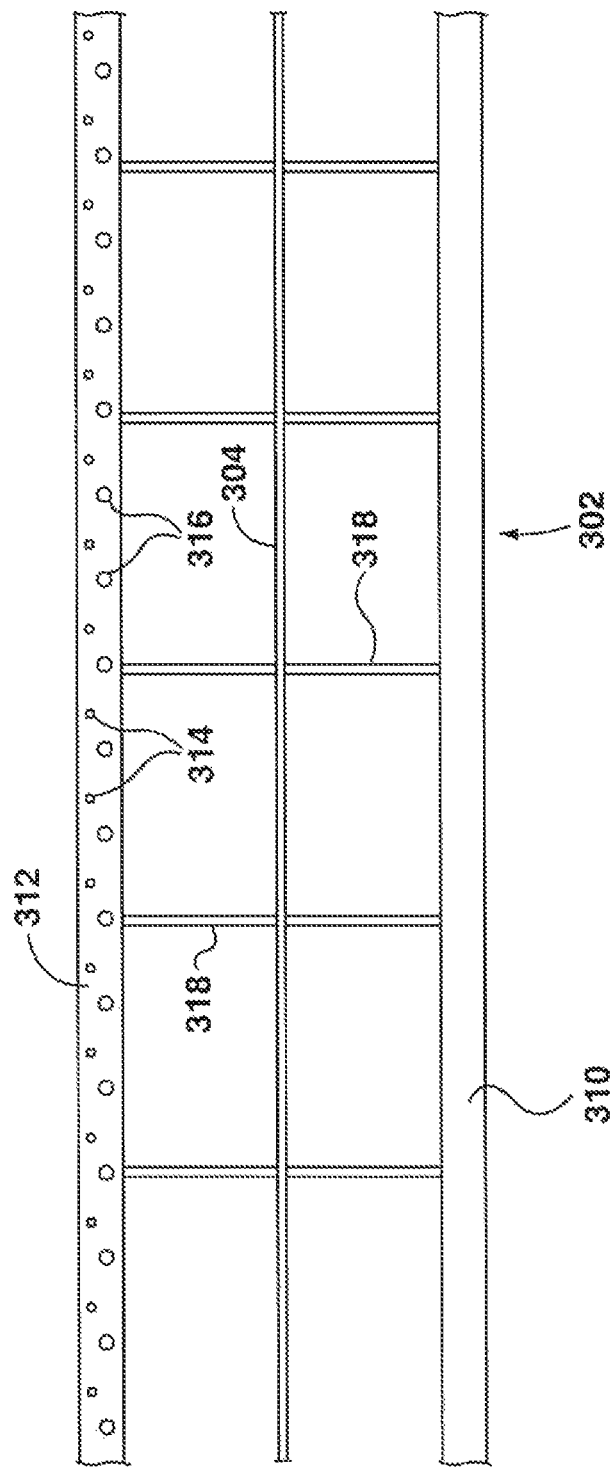

SNOW-LUTIONS

FIELD OF INVENTION

This invention relates to a method and system of distributing a fluid onto a selected surface comprising: a sprinkler system having a sprinkler head; structure for distributing the fluid through the sprinkler system where the sprinkler head has a first and second aperture for applying de-icing fluid in the winter and summer nutrients during the summer.

BACKGROUND TO THE INVENTION

Many homeowners and businesses have sprinkler systems for irrigating lawns, vegetation, plants, vegetables and the like. Many of these irrigation systems comprise of a sprinkler system which is located underground having a plurality of sprinkler heads that pop up under the pressure of water applied by a pumping system. These sprinkler system and others have controllers which in many cases comprise of programmable units or computers to apply water on a desired area or surface at a selected interval. In other cases, sensors are utilized to monitor environmental conditions and activate the sprinkler systems at a selected interval under selected conditions.

Furthermore, there have been a variety of de-icing systems that have heretofore been designed in order to attempt to clear selected surfaces from the accumulation of snow or ice. Such systems are utilized so as to minimize human effort which may in certain circumstances lead to health conditions due to the age of the individual trying to clear the snow or ice. In other cases the de-icing systems are relied upon to quickly respond to conditions such as clearing of paths, driveways, sidewalks, parking lots, airplane runways, bridges, or the like.

For example, U.S. Published Application US2006/0204647 A1 describes a system and method to deice or remove snow or ice accumulated on a surface which comprises a weather sensor, control means, a compressor containing a de-icing agent, a heater to heat the agent, a second de-icing agent stored in a second storage tank to communicate with a compressor, and means for distributing the de-icing agent through one or more zones, each zone including a sprinkler head and piping. When air temperature is below freezing and humidity exceeds 99% a control means causes a de-icing agent to be heated and the heated agent distributed through a zone. The second agent is distributed through the zone, and then the pressurized gas purges the zone of residual agents.

Moreoever, U.S. Pat. No. 7,588,195 illustrates a de-icing apparatus which may include a reservoir containing a de-icing agent, a distribution network, and at least a first nozzle for de-icing a surface, such as a sidewalk. In one embodiment at least one or more of the reservoir or distribution network is located underground and at least one or more of the reservoir, distribution network, and nozzle is operatively fixed with respect to the associated surface. The apparatus may further be provided with pumping means for pumping the de-icing agent through the apparatus.

U.S. Pat. No. 7,658,333 relates to an irrigation system comprising sprinkler heads with an electronically configurable spray pattern, moisture sensors and a controller. Based on input signals from the moisture sensors, the controller dynamically configures the spray pattern of the sprinkler head to allow more water to fall on areas that need to be watered and less water to fall on areas that do not require additional water.

Furthermore, U.S. Pat. No. 4,676,918 relates to an antifreeze composition and preparation for making surfaces free of snow and ice comprising an amount of 20-90% by weight of a waste concentrate of alcohol distilling industry, having a dry substance content of 200-750 g/kg in admixture with 20-80% by weight of water and optionally with additives.

It is an object of this invention to provide an improved de-icing system and method and sprinkler heads then compared with the prior art. It is also an object of this invention to provide a system and method having a dual summer and winter operation as required during selected time intervals.

There is a need to reduce manual labour, snow blowers, tractors, trucks, ploughs, shovels and brooms and other equipment commonly used in the removal of ice and snow from residential and pubic sidewalks, roads, highways, driveways, parking lots, shopping, centres, bridges, airport runways and flat roofs. There is a need to reduce the need for hoses, portable water sprinklers and carrying utensils in relation to fertilizing and watering plants and lawns. It is an object of the invention to reduce injuries, heart attacks, back pain, damage to roads and property and $CO_2$ emissions.

It is an aspect of this invention to provide a method of distributing a fluid onto a selected surface comprising: a sprinkler system having a sprinkler head, a network of pipes and pumps for distributing the fluid through the sprinkler system; a sprinkler head having a first and second aperture. The first aperture comprises a mist aperture and the second aperture comprises a directional spray aperture. In one embodiment, the distributed fluid comprises calcium acetate or potassium acetate to be applied to a first surface comprising a driveway, asphalt, sidewalk, parking lot, plane runway, bridge, or the like. The de-icing fluid is directed and distributed to the first selected surface for a selected time interval.

In another embodiment, the distributed fluid comprises liquid fertilizing agent which is distributed onto a second selected surface such as a garden, lawn or the like.

It is another aspect of this invention to provide a system for distributing a de-icing fluid onto a first selected surface comprising: a sprinkler system having a plurality of sprinkler heads, a network of underground pipes and pumps for distributing the fluid through the sprinkler system; the de-icing fluid comprising potassium acetate or calcium magnesium acetate. In one embodiment, the system includes a controller for controlling the distribution of the de-icing fluid at a selected time interval. In another embodiment, the controller comprises a digital programmer and the system includes sensors for sensing environmental conditions and varying the distribution of de-icing fluid at each of the plurality of sprinkler heads to provide a desired distribution.

In another embodiment, the system is operable to convert to apply a summer nutrient fluid comprising of nitrogen, potassium and phosphorous to a second selected surface.

Yet another aspect of this invention comprises a process for melting and reducing the accumulation of snow and ice on a first selected surface which comprises a digital controlled winter weather outdoor sprinkler system using a fluid comprising of potassium acetate and calcium magnesium acetate under pressure, which process can be converted to apply a summer nutrient solution comprising of nitrogen and potassium and phosphorous to lawns, gardens, plants and the like.

These and other objects and features of the invention shall now be described in relation to the following drawings.

DESCRIPTION OF THE DRAWINGS

FIG. 7 is a top view of the sprinkler head with the top removed.

FIG. 8a is a side elevational view of one of the eyeball socket directional spray apertures.

FIG. 8b is a front view of an eyeball socket directional spray aperture.

FIG. 8c is a back view of an eyeball socket directional spray aperture.

FIG. 10 is a top plain view of the embodiment of FIG. 9.

DETAILED DESCRIPTION OF THE INVENTION

Like parts have been given like numbers throughout the figures. Some of the drawings may not be scale and are drawn for purposes of illustrating the invention.

Figure 1:
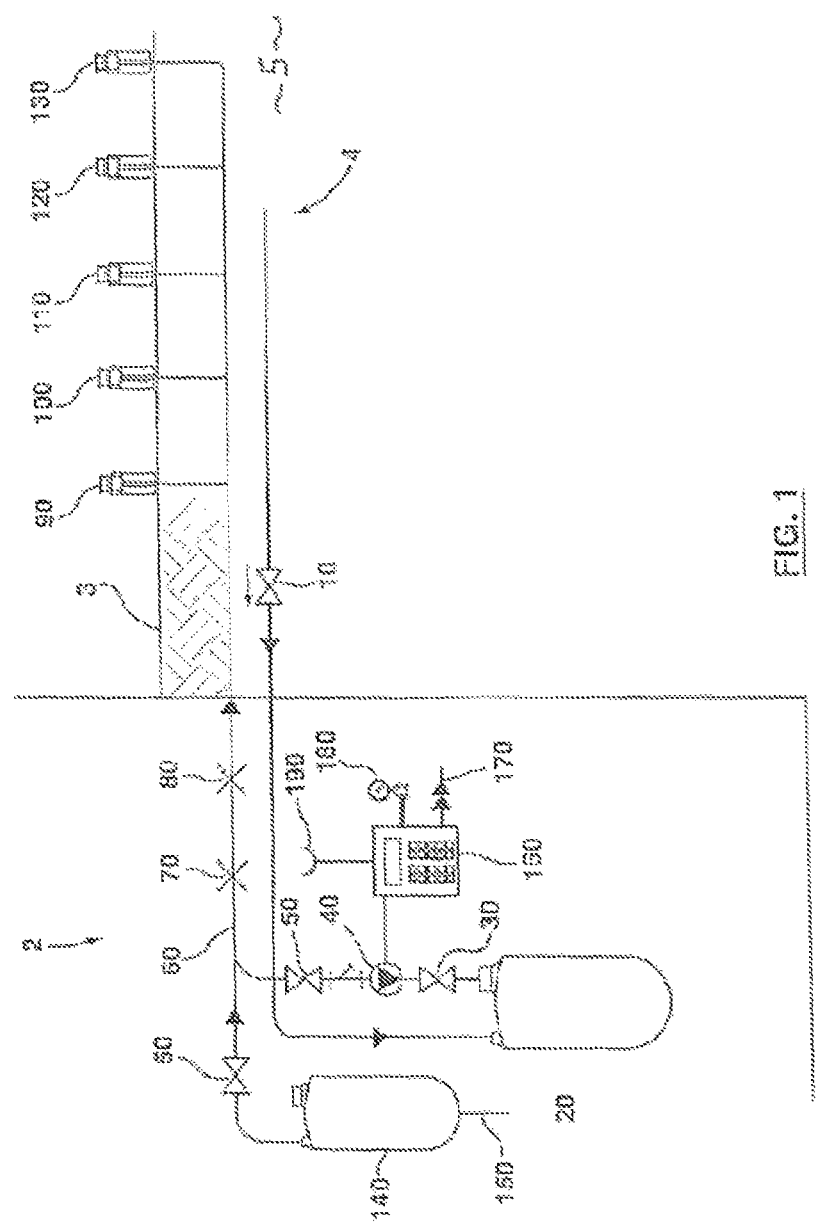
FIG. 1 is a schematic view illustrating the system.

FIG. 1 is a schematic view of the system and method embodied therein.

Generally speaking, FIG. 1 illustrates a system 2 for distributing a de-icing fluid onto a first selected surface 3 such as a driveway, a sidewalk, airport, runway, bridge, roof, or the like and a second surface 5. The system 2 includes a sprinkler system 4 having a plurality of sprinkler heads 90, 100, 110, 120, 130 with structure or means or distributing the fluid through the sprinkler system 4.

In one embodiment of the invention the de-icing fluid comprises potassium acetate or calcium magnesium acetate. However other de-icing fluids can be used.

The system 2 also includes a domestic cold water connection 10 having a C/W backflow preventer, as well as a container or tank 20 which can include the de-icing solution as referred to above for winter application or a summer nutrient solution which contains nitrogen, potassium and phosphorous for summer application.

The system 2 can also include in one embodiment a strainer 30 as well as a pump 40 which can be utilized to pump fluid under pressure through the tubing 60 in a manner well known to those versed and skilled in the art. Tubing can comprise of any material including PVC in a manner well known to those persons skilled in the art. The system 2 can also include a solenoid valve 50 that can be activated and de-activated again in a manner well known to those persons skilled in the art and shall be described herein.

A flow sensor 70 can be utilized to sense the flow of fluid and which flow sensor can include a preset timer. A pressure sensor 80 can be utilized in line to increase or decrease the spray pressure depending in the wind velocity or direction. In other words, each spray head 90,100,110,120,130 can include a pressure sensor which communicates with controller 160 so as to increase or decrease the pressure of fluid applied to each individual head in the event that the sensors sense for example wind conditions which may blow the de-icing fluid from one side of the driveway to another to produce uneven distribution of de-icing fluid over the entire desired or selected surface. A controller such as for example a programmable logic control (PLC) can be used to control the flow rate or pressure. By increasing the pressure of fluid flowing from one side of the driveway to another, environmental conditions such as wind may be compensated for so as to product a more even distribution of de-icing fluid on the selected surface 3.

Figure 2:
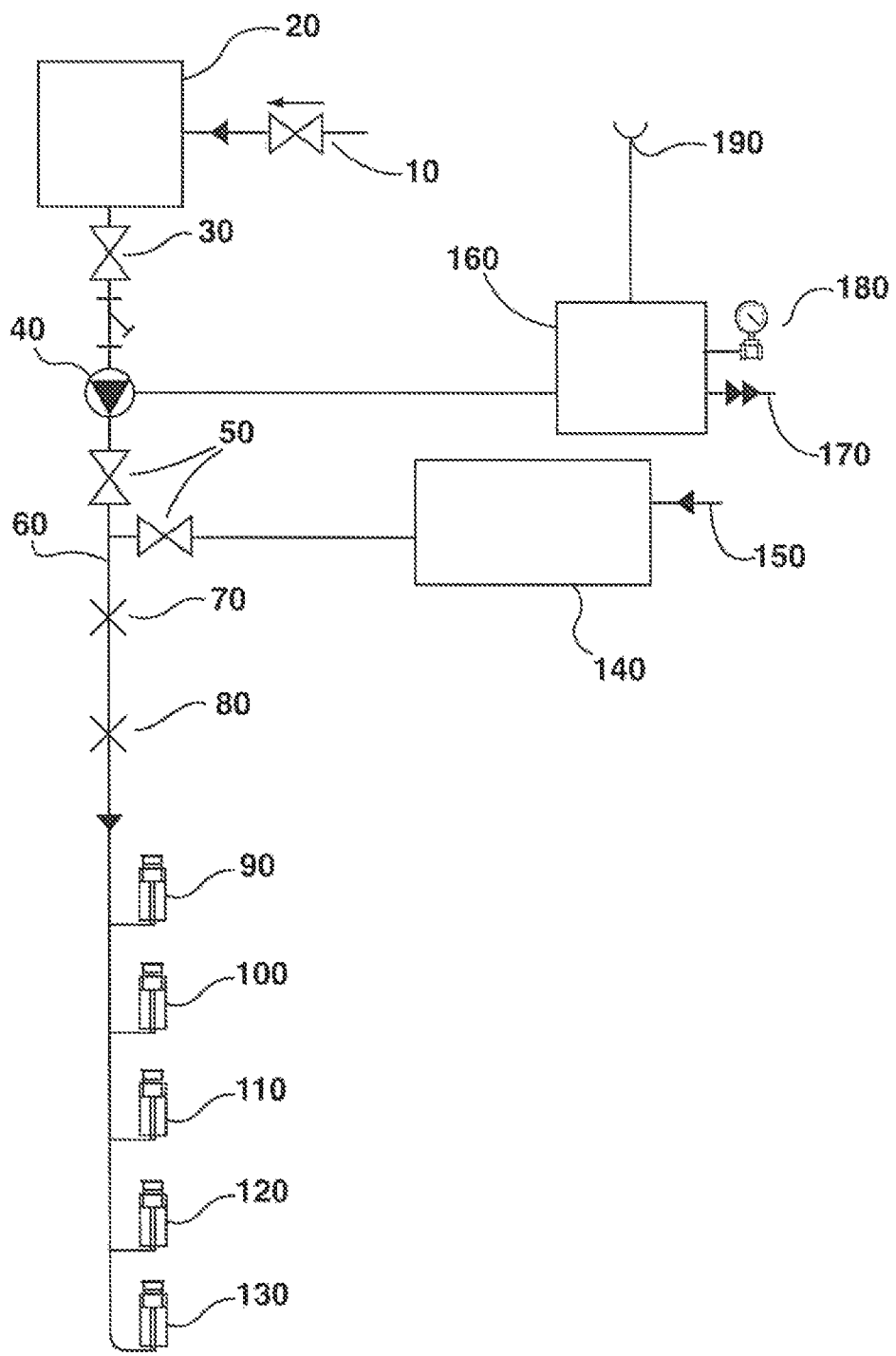
FIG. 2 is a second schematic view illustrating the system.

In the embodiments shown in FIGS. 1 and 2, sprinkler heads 90 may be utilized for flat roofs so as to minimize the accumulation of snow and ice which can cause collapse of the building if excessive.

Furthermore, sprinkler heads 100 may be utilized on public or private walkways while sprinkler heads 110 can be utilized for commercial applications where one head is used for every 100 square feet. Moreover, sprinkler head 120 can be used for residential applications one head for every 10 linear feet.

Sprinkler heads 130 can be used in one embodiment for summer time nutrient application.

The system 2 can also include a purge tank 140 which in the embodiment shown here comprises an air compressor or other pneumatic fluid. In the embodiment described herein, the purge tank 140 is activated at the end of a cycle so that system 2 purges itself of all solutions.

The system also includes an electrical feed 150 which can comprise of 12 volt DC or 120V AC. Backup systems are available with solar batteries and mini generators.

The system 2 also includes a control sensor 160 which can have PLC keypads. In one embodiment the PLC may eliminate the solenoid valves. Electrical connection 170 is provided.

The system 2 is programmable and accessible through the internet or SCADA which stands for Supervisory Control and Data Acquisition and generally refers to an industrial control system or computer system monitoring and controlling a process. An AQUASTAT 180 may be utilized. AQUASTATS are devices used in hydronic heating systems for controlling water temperature.

The system 2 can also include ambient or environmental condition sensors 190 which sense the presence of snow, rain, wind direction and temperature and may be programmed to activate the system in the manner to be described herein.

In one embodiment, when the sensors 190 detect moisture as well as the ambient temperature, an electrical signal is sent to the digital controller 160. The digital controller 160 accesses a program which is operable to automatically activate the system 2 once selected parameters are reached, such as for example, length of snowfall, ice accumulation, temperature and the like.

For example, in one embodiment if the sensors 190 sense that the snowfall is present from 0-15 minutes the system 2 may be activated if other conditions are present such as temperature or humidity. In other cases, the system may be activated if the snowfall continues from 15-30 minutes.

The system 2 as designed herein is utilized to dispense a fluid onto a selected surface. The selected surface 3 in one embodiment can comprise of a first surface 3 such as a sidewalk, driveway, airport runway, bridge, parking lot or the like for winter application or a second surface such as a lawn, garden, for summer application to be described herein.

The winter applications can be automatically or manually converted to summer applications. A number of options may be included including infrared body heat sensors for spray control in the event that a person is identified or sensed in a particular zone. Other enhancements may include wind control for spray units which control pressure or volume of spraying of each of the units so as to produce a more uniform spray on a first selected surface such as a driveway to compensate for wind direction.

Various spray patterns can be utilized such as low profile or horizontal. Moreover, the solution tank (20) may be filled with slow dissolve pellets, pucks or concentrates that mix with water or the like. The timer operation of the controller (160) is based on the input from the sensors (190). Moreover, automatic system pumpdown and purging can be utilized upon cycle completion.

The invention described herein relates to a digital controlled weather outdoor network system using environmentally friendly melting fluid under pressure for the purpose of controlling snow and ice accumulation on residential driveways, parking lots, sidewalks, bridges, airport tarmacs, flat roofs, hospital areas which can activated by environmental sensors that sense whether temperature precipitation or the like. As described above, the liquid storage tank holds the solution. In one embodiment the formulated concentrate controls solution comprises a potassium acetate and calcium magnesium acetate which is dispersed into the storage tank to create a temperature based solution. In other words, the concentration of potassium acetate and calcium magnesium acetate will be increased if for example extremely cold temperatures exist, whereas less potassium acetate and calcium magnesium acetate will be utilized if the ambient temperature hovers just below freezing. The controller 160 can automatically increase or decrease the concentration of de-icing fluid based on data and program resident in the digital computer. Furthermore, the controller 160 may be accessed wirelessly or USB connection to the internet so that the system 2 can be activated remotely from a different location.

The weatherized sprinkler heads 90,100,110,120 and 130 are designed to spray the solution onto the first or second surfaces before or during a snow or ice event controlled by a custom designed PLC panel that communicates with the internet. When the cycle is complete, the system pump 40 can reverse the pressure and purge all the flow tubes 60 empty. The solution is environmentally friendly and exhibits little if any corrosive effect.

According to another embodiment of the invention, the spraying network can be divided into sub-networks for spraying distinct zones. According to another embodiment of the invention, the apparatus may be selectively operable to provide de-icing solution in the winter or summer application to one or more selected zones. According to another embodiment of the invention, the apparatus may be selectively programmable to provide de-icing solution or summer application at specific intervals.

In the summer embodiment, the sprinkler heads have configurations spray patterns, moisture sensors and controllers and upon input signals from the moisture sensors, the controller configures the spray pattern of the sprinkler head to allow more liquid to fall on areas that need it and less to fall on areas that do not need it. Another embodiment of the invention is that the system 2 can be integrated into existing lawn sprinkler systems 2. The pump 40 can also be used in the fall to purge existing underground water irrigation systems. Wind directional sensors 190 control the sprinkler flows to allow maximum spray pattern coverage on the selected first or second surfaces. Fertilizing solutions can be dispensed into the system 2 for the growing seasons for grass, gardens and flowerbeds all digitally controlled to activate a plurality of times a year. The invention described herein relates to a year round outdoor surface network system.

Figure 3:
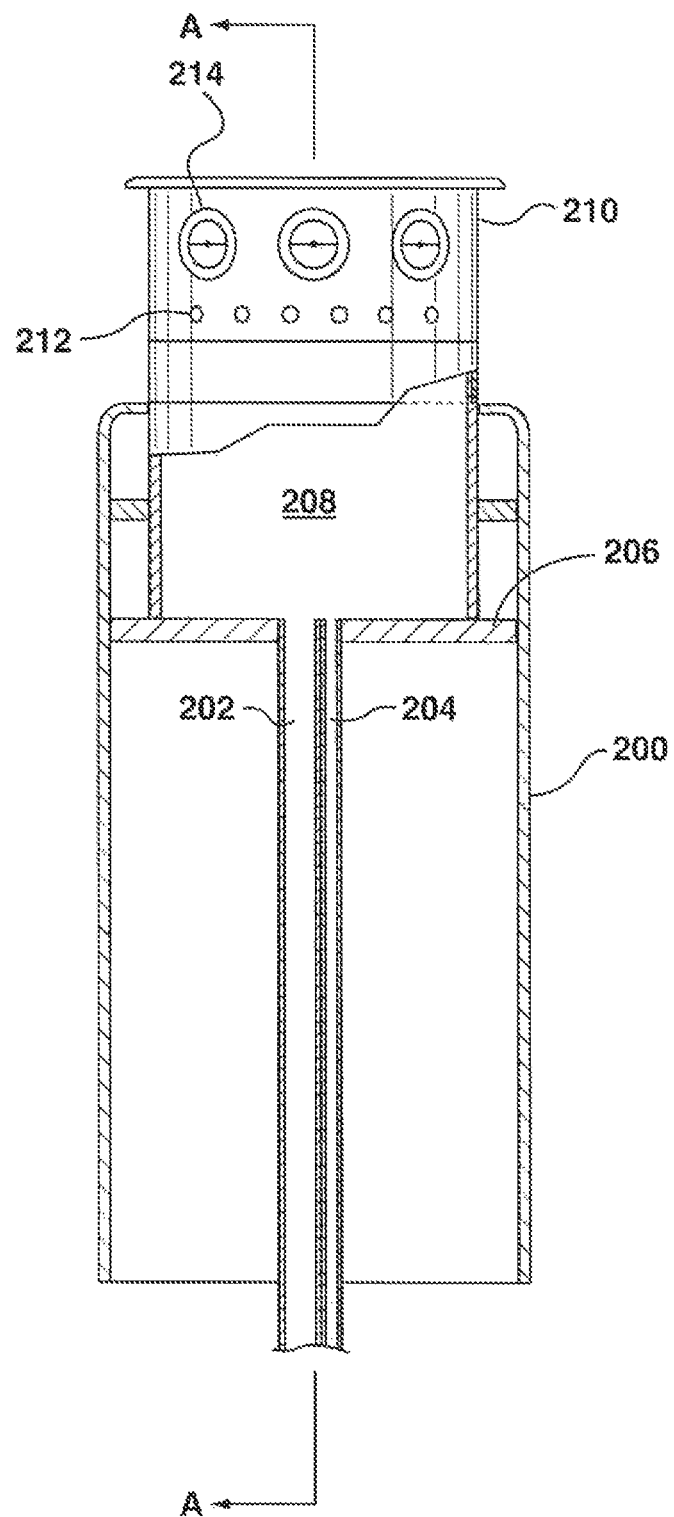
FIG. 3 is a front elevational view of the sprinkler head.
Figure 4:
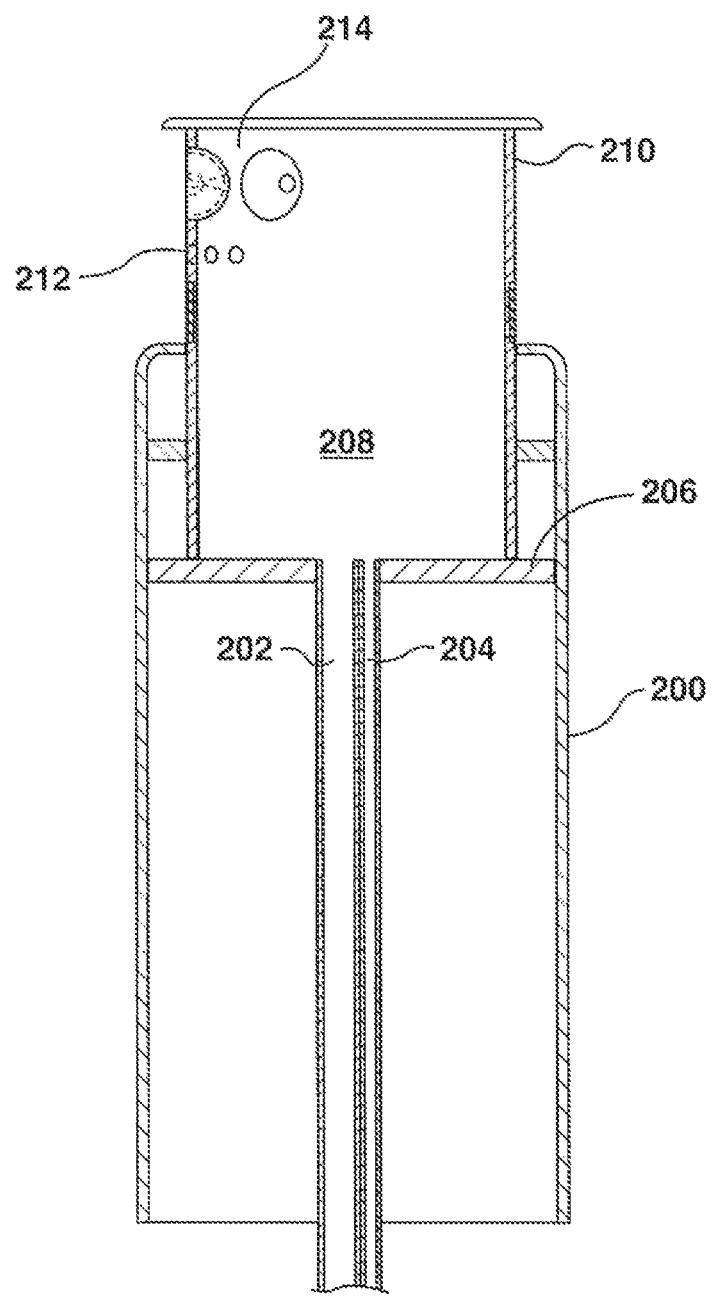
FIG. 4 is a cross-sectional view of the sprinkler head.
Figure 5:
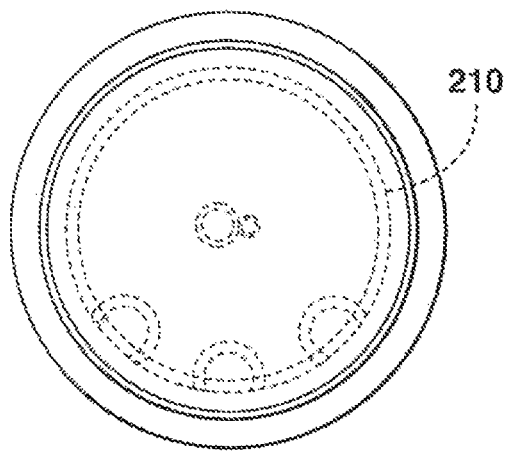
FIG. 5 is a top view of the sprinkler head.
Figure 6:
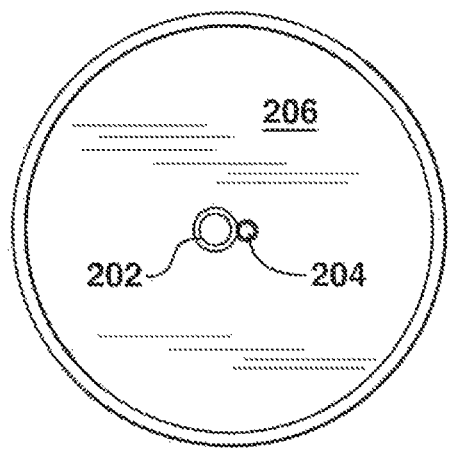
FIG. 6 is a bottom view of the sprinkler head.

The sprinkler system utilized herein includes sprinkler heads 90,100,110,120 and 130 or particularly described as shown in FIGS. 3 and 4. The sprinkler heads include a housing 200 having a fluid channel 202 and a pneumatic or air channel 204 that protrude through the compression base or plate 206 and communicate with the compressed chamber 208 so that the sprinkler unit 210 pops up. The de-icing fluid or summer nutrient communicates with the interior of the sprinkler head 10 whereby a plurality of mist apertures 212 apply the fluid in the vicinity of the spray head 210.

A plurality of eyeball socket directional spray apertures 214 apply the fluid at a greater range.

In one embodiment illustrated in FIGS. 7 and 8a, 8b, 8c, the eyeball socket directional spray apertures comprise of a retainer 240 having ends 242 which are attached to the inside of the sprinkler head 210. The retainer 240 has a port 244 at the back end which communicates with a nozzle member 246 having an exit port 248. The exit port 248 may be elongated and include a slotted area so as to receive a key or flathead screwdriver head to adjust the angle or rotation orientation of the nozzle within the eyeball socket retainer 240.

The invention described herein also relates to a method of distributing a fluid onto a selected surface which comprises a sprinkler system for having a sprinkler head 90,100,110,120 or 130 with a pump 40 for distributing the fluid through PVC piping 60 where the sprinkler heads 210 have a first or mist aperture 212 and second or eyeball socket directional spray apertures 214. The method includes a first selected surface for distributing a de-icing fluid to reduce the accumulation of snow and ice. The method also includes a second selected surface for distributing liquid fertilizing agent onto the second selected surface.

The method includes a sprinkler head which includes a first chamber communicating with the first and second apertures 212 and 214 respectively; a fluid channel 202 for communicating fluid with the fluid chamber 208; and a pneumatic channel for purging the fluid from the fluid chamber and sprinkler system after the expiration of the selected intervals.

Formulated concentrated control solution is dispensed into the storage tank to create a temperature-based solution. When the system is triggered by sensors indicating snow or ice, solenoid valves will activate, pumps will engage the fluid to underground plastic tubes dispensed through weather resistant spray heads specifically designed to perform during wind events and deactivate when body heat is present. The weatherized sprinkler heads will spray the solution onto the surfaces before and during a snow event controlled by a custom design PLC panel that will have intelligent communication via the internet. When the cycle is complete, the system pump will reverse the pressure and purge all the flow tubes empty. The pump can also be used in the fall to purge existing underground water irrigation systems. Wind direction sensors control the sprinkler flow to allow maximum spray pattern coverage on the surfaces. Fertilizing solution can be dispensed into the system for the growing season for grass, gardens, plants and flowers, all digitally controlled to activate 3 or 4 times a year.

Figure 9:
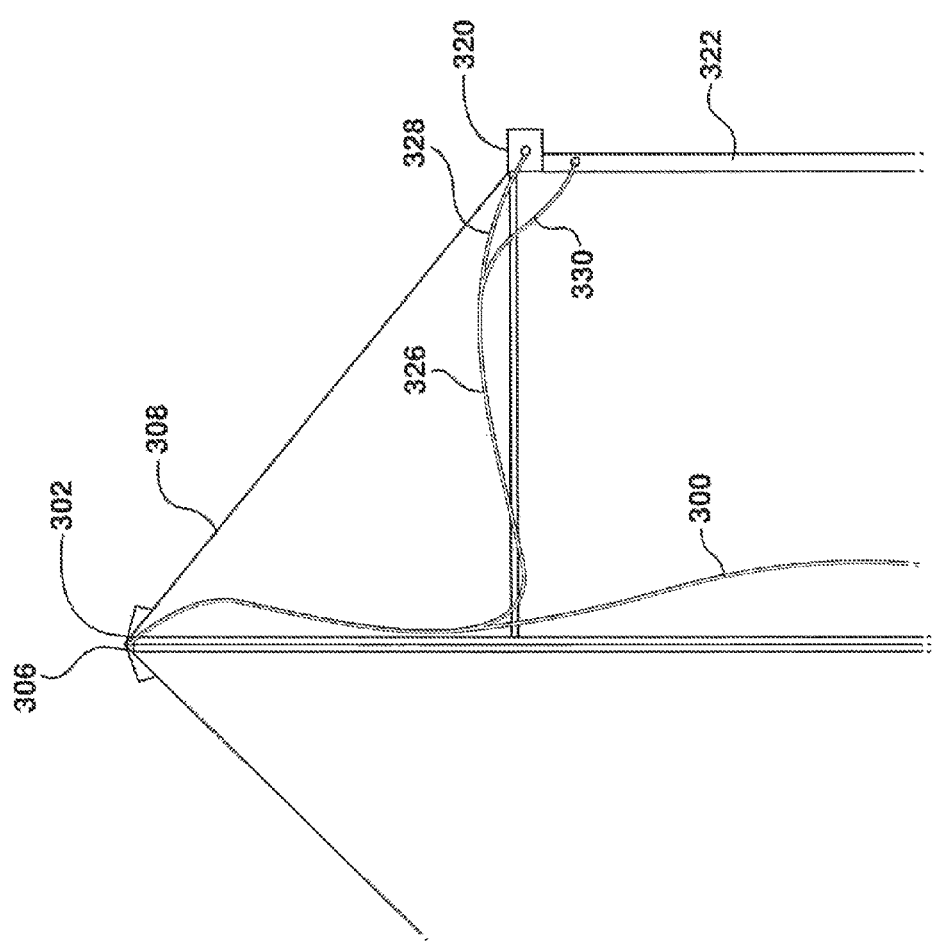
FIG. 9 is a side elevational view illustrating another embodiment of the invention in relation to a roof application.

FIG. 9 illustrates another embodiment of the invention in relation to roof applications. In particular, the system includes a transmission line 300 which communicates with the system in the winter mode so as to pump fluid to the roof spraying means 302. The roof spraying means 302 is more fully particularized in FIG. 10 and comprises a main transmission line 304 that communicates with transmission line 300, and is adapted to overly or be adjacent to the ridge or apex 306 of the roof 308.

The roof spraying means 302 can comprise of spray manifolds 310 which are adapted to spray fluid down along the roof 308. The fluid solution is that as described before. Furthermore, the roof can comprise of shingles, metal or plastic. Alternatively, the roof spraying means 302 can comprise of a spray bar 312 having a plurality of small apertures 314 to spray the fluid in close proximity to the plurality of small apertures 314. Furthermore, the spray bar 312 may also include larger apertures 316 for spraying the fluid further down the roof 308.

Moreover, the roof spraying means 302 includes a plurality of feed lines 318 so as to communicate fluid from the main transmission line 304 to the spray manifolds 310 or plurality of small and large apertures 312 and 314.

The rooftop system described in FIGS. 9 and 10 minimizes the need for expensive heating systems that can be applied to the roof so as to melt the accumulation of snow and ice. Such expensive heat systems constantly draw on high levels of electricity at a high cost. The system described here employs a product that sprays the rooftops along the roof.

Furthermore, the system as described in FIGS. 9 and 10 also sprays the roof 308 along with the gutters 320 and downspouts 322. The solution may be sprayed during snow or prior to snow disturbances.

When snow occurs, the system as described herein becomes active as previously described melting snow and ice regardless of temperatures. The system may cycle depending on the length of storm and the amount of storm as previously described. Once the occurrence is over the system will automatically cycle to prepare for the next snow or freezing event.

The system as described in FIG. 9 also includes heater conduits 326, 328 and 330 so as to communicate fluid to the eaves troughs 320 and downspouts 322 through spraying means which can include the spraying means as previously described.

The system as described herein can be designed for residential, commercial and industrial uses, on all types of roofs as previously described. The system described herein minimizes the build-up of dangerous ice in valleys, gutters, downspouts that can cause damage to the roof and pedestrians. Furthermore, the system as described herein eliminates dangerous loads on flat roofs which can cause flat roofs to collapse. The systems keeps all drain areas clear and ice free.

We claim:

1. A method of distributing a fluid onto a first selected surface or a second selected surface being different from the first selected surface, the method comprising:
   (a) providing a dual-purpose snow melting and irrigating or fertilizing fluid spraying system having a plurality of spray heads, wherein each of said spray heads includes a pop-up sprinkler unit with a fluid chamber defined by a cylindrical side wall, the cylindrical side wall having at least one mist aperture and at least one directional spray aperture defined therethrough;
   (b) selectively distributing one of either a snow melting fluid and an irrigation or fertilizing fluid through said dual-purpose system onto the first selected surface, wherein said one fluid is sprayed:
      (i) as a mist through each of said at least one mist apertures, and
      (ii) as a directed spray through each of said at least one directional spray apertures; and
   (c) selectively distributing the other of the snow melting fluid and the irrigation or fertilizing fluid onto the second selected surface, wherein said other fluid is sprayed:
      (i) as a mist through each of said at least one mist apertures, and
      (ii) as a directed spray through each of said at least one directional spray apertures.

2. The method as claimed in claim 1, wherein the first selected surface is selected from the group consisting of sidewalks, driveways, asphalt surface and roof.

3. The method as claimed in claim 2, wherein the fluid comprises deicing fluid, which includes one of calcium acetate and potassium acetate.

4. The method as claimed in claim 1, wherein the step of providing said dual-purpose system comprises integrating the system with an existing summer sprinkler system.

5. The method as claimed in claim 1, wherein said selective distributing of said snow melting fluid and said selective distributing of said irrigation or fertilizing fluid occurs at selectable first and second intervals, respectively, for dual winter and summer applications.

6. The method as claimed in claim 5, wherein the snow melting fluid is delivered from a reservoir.

7. The method as claimed in claim 6, wherein a pumping means is activated for said selectively distributing of each of the snow melting fluid and fertilizing fluid onto the respective first and second selected surfaces at said selectable first and second intervals.

8. The method as claimed in claim 5, further including comprising a step of purging of the respective fluids from the system at the end of each of said intervals during said winter and summer applications, respectively.

9. A system for selectively distributing a selected seasonal fluid onto a first selected surface or a second selected surface, the system comprising:
   a dual-purpose snow melting and irrigating or fertilizing fluid spraying system, said system comprising:
      (a) a first plurality of spray heads for selectively distributing a snow melting fluid onto the first selected surface, wherein the snow melting fluid comprises potassium acetate or calcium magnesium acetate; and
      (b) a second plurality of spray heads for selectively distributing an irrigating or fertilizing fluid onto the second selected surface;
   wherein each of the first and second spray heads includes a pop-up sprinkler unit with a fluid chamber defined by a cylindrical side wall, the cylindrical side wall having at least one mist aperture and at least one directional spray aperture defined therethrough, wherein said snow melting fluid is selectively distributed onto said first selected surface through said first plurality of spray heads, and said irrigating or fertilizing fluid is selectively distributed onto said second selected surface through said second plurality of spray heads.

10. The system as claimed in claim 9, further comprising:
    a controller for controlling the distribution of the snow melting fluid at a selected time interval; and
    a purge tank to purge the snow melting fluid from the system at the end of the interval.

11. The system as claimed in claim 9, wherein the first selected surface comprises one or more of concrete, asphalt, a parking lot, a bridge, and a roof; and the second selected surface comprises a lawn or a garden; and wherein the first plurality of spray heads each has a fluid channel communicating said snow melting fluid with said fluid chamber, and an air channel communicating with said fluid chamber.

12. The system as claimed in claim 10, further comprising sensors which sense wind velocity at each of said first and second spray heads, the sensors communicating with the controller so as to adjust the degree of distribution of fluid through each of the spray heads.

13. The system as claimed in claim 12, further comprising:
    a spray bar mounted to a roof of a structure, the spray bar having a plurality of first bar apertures and a plurality of second bar apertures, the second bar apertures being larger than the first bar apertures;
    a pump; and a conduit fluidly connected between the spray bar and the pump, wherein the snow melting fluid can be selectively pumped to the roof and through the first and second bar apertures, whereby the first bar apertures distribute the snow melting fluid to a first location in close proximity to the spray bar and the second bar apertures spray the snow melting fluid to a second location which is comparatively further away from the spray bar relative to the first location.

* * * * *